United States Patent
Xi et al.

(10) Patent No.: US 7,091,681 B2
(45) Date of Patent: Aug. 15, 2006

(54) DRIVE CIRCUIT FOR BRUSHLESS DC FAN MOTOR

(75) Inventors: Junnan Xi, Miyota-machi (JP); Mitsuo Konno, Miyota-machi (JP); Susumu Yamamoto, Miyota-machi (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 10/819,223

(22) Filed: Apr. 7, 2004

(65) Prior Publication Data

US 2004/0189222 A1 Sep. 30, 2004

Related U.S. Application Data

(63) Continuation of application No. 10/446,731, filed on May 29, 2003, now abandoned, which is a continuation of application No. 10/224,374, filed on Aug. 21, 2002, now abandoned.

(30) Foreign Application Priority Data

Oct. 11, 2001   (JP) ............................. 2001-314206

(51) Int. Cl.
*H02P 7/06* (2006.01)

(52) U.S. Cl. ...................... 318/254; 318/439; 318/138

(58) Field of Classification Search ................ 318/254, 318/439, 138, 720–724
See application file for complete search history.

(56) References Cited

U.S. PATENT DOCUMENTS

| | | | |
|---|---|---|---|
| 4,365,187 A * | 12/1982 | McDaniel et al. ........... 318/254 |
| 4,553,075 A | 11/1985 | Brown et al. | |
| 4,563,622 A | 1/1986 | Deavers et al. | |
| 4,618,806 A | 10/1986 | Grouse | |
| 5,099,181 A * | 3/1992 | Canon ......................... 318/254 |
| 5,262,703 A * | 11/1993 | Schmider et al. ........... 318/138 |
| 5,589,745 A * | 12/1996 | Hans et al. .................. 318/431 |
| 5,659,230 A * | 8/1997 | Fukuoka ...................... 318/254 |
| 5,920,176 A | 7/1999 | Blackburn et al. | |
| 6,297,603 B1 | 10/2001 | Carobolante | |
| RE37,589 E * | 3/2002 | Mueller ....................... 318/254 |
| 6,392,372 B1 | 5/2002 | Mays | |
| 6,703,803 B1 * | 3/2004 | Ohiwa et al. ................ 318/138 |

FOREIGN PATENT DOCUMENTS

GB    2247999 A    3/1992

* cited by examiner

*Primary Examiner*—Marlon Fletcher
*Assistant Examiner*—Eduardo Colon Santana
(74) *Attorney, Agent, or Firm*—Oliff & Berridge, PLC

(57) ABSTRACT

A drive circuit for a brushless DC fan motor for rotating a rotor (permanent magnet) by a rotating magnetic field produced by turning on/off the flow of electric current to field coils by a signal to control terminals of switch elements in which switch sections are each connected in series with the field coils. When connecting capacitors for absorbing a current spike in parallel with the switch sections of the switch elements, resistors are each connected between the field coil and switch section, through which the capacitors are connected in parallel with the switch sections. A discharge current of the capacitors which absorbed a current spike when turning on the switch elements is passed via the resistors, thereby eliminating a current spike.

2 Claims, 4 Drawing Sheets

DRIVE CIRCUIT FOR BRUSHLESS DC FAN MOTOR

This is a Continuation of application Ser. No. 10/446,731 filed May 29, 2003 now abandoned, which in turn is a Continuation of application Ser. No. 10/224,374 filed Aug. 21, 2002 now abandoned. The entire disclosure of the prior applications is hereby incorporated by reference herein in its entirety.

BACKGROUND OF THE INVENTION

1. Field of the Invention

The present invention relates to a brushless DC fan motor suitably radiating heat generated in a housing of electronic equipment, more particularly, to a drive circuit therefor.

2. Description of the Related Art

For example, in electronic equipment having a large number of electronic parts housed in a relatively narrow housing, such as OA (office automation) equipment including a personal computer, a copying machine and so on, the housing may be filled with heat generated from the above electronic parts, thereby breaking the electronic parts by heat.

Therefore, an air blower is provided in a wall surface or a ceiling surface of the housing of the electronic equipment, to which a fan motor is attached, thereby externally exhausting the heat in the housing.

While a brushless DC fan motor is often used as this type of fan motor, a conventional drive circuit for driving such a brushless DC fan motor will be shown in FIG. 4.

In the drawing, reference numeral 41 denotes a drive circuit for a brushless DC fan motor, here, which indicates a drive circuit in a brushless DC fan motor 42 of a two-phase unipolar drive type. Symbols + and − indicate the anode and the cathode of a DC source, respectively.

As shown in the drawing, the brushless DC fan motor 42 includes field coils (motor coils) L1 and L2. The field coils L1 and L2 are provided at a stator (not shown) and the flow of electric current is switched alternately by switch elements of the drive circuit 41, which are NPN transistors T3 and T4 here, to establish a rotating magnetic field. A rotor (not shown) of the fan motor 42 includes a permanent magnet, the permanent magnet being rotated following the rotating magnetic field to rotate the rotor.

The drive circuit 41 is constituted by a control circuit CC, resistors R1 to R9, PNP transistors T1 and T2, Zener diodes ZD1 to ZD4, diodes D1 and D2, and the above-mentioned transistors T3 and T4.

The control circuit CC receives a signal from a hall element 43 for detecting the location of the rotor (permanent magnet) and outputs a signal for performing an on-off control of the transistors T3 and T4. In other words, after the output signal from the control circuit CC the polarity of which has been reversed and the signal has been amplified by the transistors T1 and T2, it is input to the transistors T3 and T4, thereby performing the on-off control of the transistors T3 and T4.

Accordingly, the flow of electric current to the magnetic fields L1 and L2 is alternately switched in accordance with the location of the aforesaid rotor to produce a rotating magnetic field, and the rotor is rotated as described above, thereby externally exhausting the heat in the housing.

In such a fan motor, there is a possibility of generating a high voltage (generating a high voltage periodically) when the electricity is turned off, thereby destroying elements including the transistors T3, T4 and so on.

Accordingly, in the above-described conventional circuit, the Zener diodes ZD1 and ZD2, and ZD3 and ZD4 are connected between a collector and the base of each of the transistors T3 and T4, respectively, thereby preventing the generation of the high voltage.

However, even if the Zener diodes ZD1 and ZD2, and ZD3 and ZD4 are connected, in the conventional circuit shown in FIG. 4, a current spike flows toward the collector of the transistors T3 and T4 when the electricity of the field coils L1 and L2 is turned off, thereby causing noise.

Also, upon starting the motor, a current spike flows toward the collector of the transistors T3 and T4, causing noise.

FIG. 5 is a view of the conventional circuit for reducing a current spike to the transistors T3 and T4, as described above.

Referring to FIG. 5, the same elements as those in FIG. 4 are denoted by the same reference numerals. Here, capacitors C1 and C2 are connected in parallel between the collector and an emitter of each of the transistors T3 and T4 in FIG. 4, respectively.

With such a construction, in the conventional circuit shown in FIG. 5, a current spike which tends to flow toward the collector of each of the transistors T3 and T4 flows toward the capacitors C1 and C2, respectively, and is then absorbed. Accordingly, the noise due to the above current spike can be reduced.

However, the effect of preventing noise was not enough even in the conventional circuit shown in FIG. 5.

More specifically, the current spike which tends to flow toward the collector of each of the transistors T3 and T4 can be securely absorbed by the capacitors C1 and C2. Consequently, the noise produced by current spike flow toward the collector of each of the transistors T3 and T4 can be prevented.

However, when turning on the transistors T3 and T4 after the current spike has flowed toward the capacitors C1 and C2, a current discharge spike of each of the capacitors C1 and C2 flows toward the collector of each of the transistors T3 and T4, respectively.

In the conventional circuit shown in FIG. 5, the noise produced by such discharge current flow poses a new problem, which was brought to the fore when chip capacitors (not shown) were used as the capacitors C1 and C2.

Accordingly, one of the solving means is to not use the chip capacitors as the capacitors C1 and C2. However, the chip capacitors (not shown) are often used as the capacitors C1 and C2 in order to respond to a requirement for miniaturization of a drive circuit board. At any rate, conventionally, reduction of the noise caused by the current discharge spike from the capacitors C1 and C2 is earnestly required to realize a low noise level.

SUMMARY OF THE INVENTION

The present invention is made in consideration of the aforesaid requirement, accordingly, it is an object of the present invention to provide a drive circuit for a brushless DC fan motor for reducing the various types of noise such as noise produced by a current spike caused by turning off the electricity of a field coil or upon startup of a motor, furthermore, the noise caused by a current discharge spike produced when a current-spike absorbing capacitor discharges and for realizing a low noise level.

In order to achieve the above object, in accordance with the present invention, a drive circuit for a brushless DC fan motor comprises: a field coil provided at a stator; a switch element in which a switch section formed between a power supply side terminal and a ground side terminal is connected in series with the field coil; a rotor having a permanent magnet; a capacitor connected in parallel with the switch section for absorbing a current spike; and a resistor inserted between the field coil and the switch section being in parallel with the capacitor for discharging the capacitor, wherein the flow of electric current to the field coil is turned on or off by a signal to a control terminal of the switch element to rotate the rotor by a rotating magnetic field produced by the field coil.

The drive circuit for a brushless DC fan motor according to the present invention further comprises a Zener diode connected between a node of the field coil and the capacitor and the control terminal of the switch element or between both ends of the capacitor in a reverse direction of the polarity therebetween.

DESCRIPTION OF THE PREFERRED EMBODIMENTS

Embodiments of the present invention will be described hereinbelow with reference to the drawings.

Figure 1:
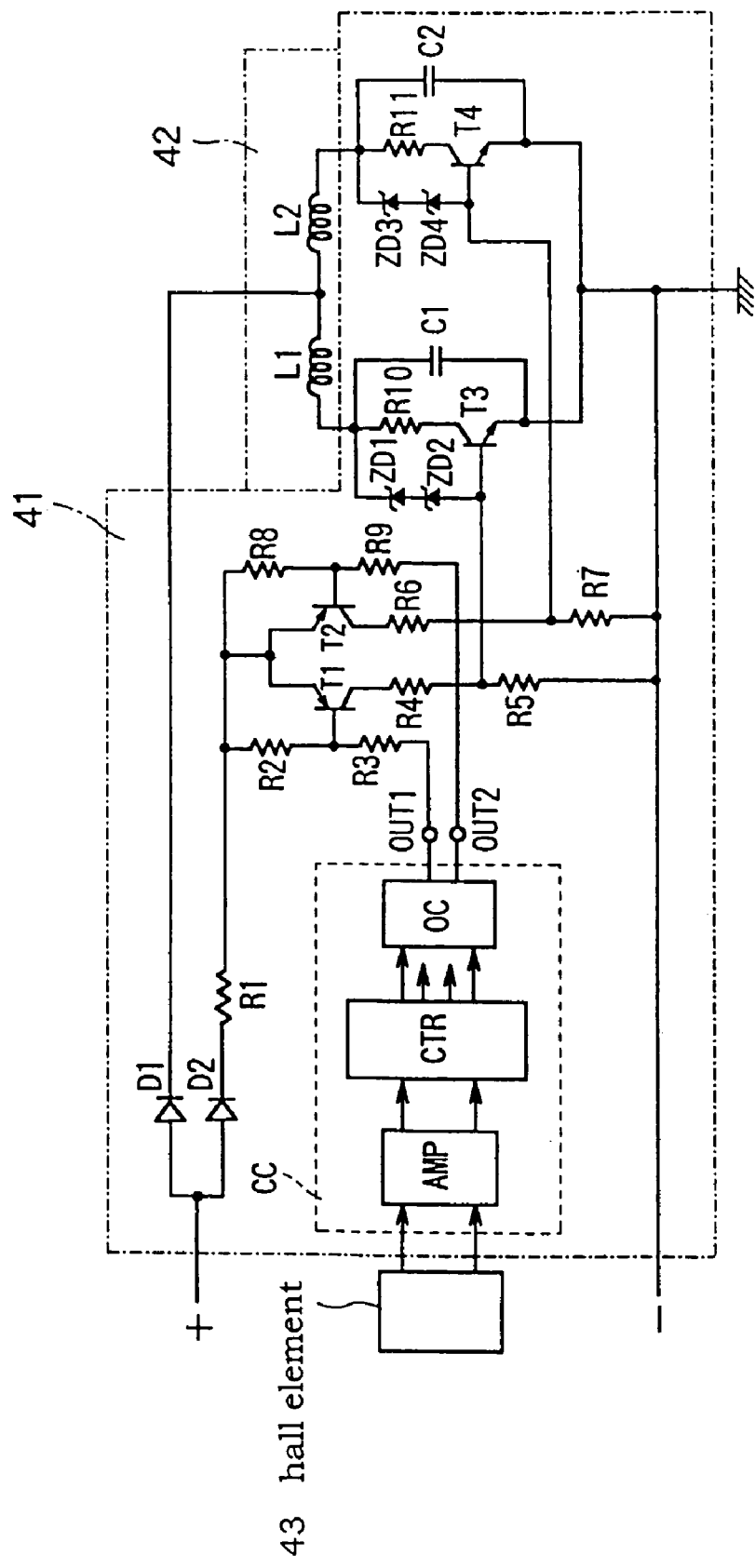
FIG. 1 is a circuit diagram of an embodiment of a drive circuit according to the present invention.

FIG. 1 is a circuit diagram of an embodiment of a drive circuit for a brushless DC fan motor according to the present invention.

In the drawing, reference numeral 41 denotes a drive circuit for a brushless DC fan motor, which indicates a drive circuit in a brushless DC fan motor 42 of a two-phase unipolar drive type. Symbols + and – indicate the anode and the cathode of a DC source, respectively.

As shown in the drawing, the brushless DC fan motor 42 includes field coils (motor coils) L1 and L2. The field coils L1 and L2 are provided at a stator (not shown) and the flow of the electric current is switched alternately by switch elements of the drive circuit 41, which are NPN transistors T3 and T4, to establish a rotating magnetic field. A rotor (not shown) of the fan motor 42 includes a permanent magnet, the permanent magnet being rotated following the rotating magnetic field to rotate the rotor.

The drive circuit 41 is constituted by a control circuit CC, resistors R1 to R11, PNP transistors T1 and T2, Zener diodes ZD1 to ZD4, diodes D1 and D2, and the above-mentioned transistors T3 and T4. The PNP transistors T1 and T2 are used for inverting the polarity and for amplification, the diodes D1 and D2 are used for preventing backflow of current, the resistors R10 and R11 are used for discharging the capacitors, and the capacitors C1 and C2 are used for absorbing a current spike.

Here, the control circuit CC includes an amplifier section AMP for amplifying a signal from a hall element 43 for detecting the location of the rotor (permanent magnet), a controller section CTR to which a signal from the amplifier section AMP is input for generating a signal for performing on/off control of the transistors T3 and T4, and an output section OC for providing the signal from the controller section CTR to the transistors T1 and T2.

The base of the PNP transistor T1 is connected to a first output terminal OUT1 of the control circuit CC via the resistor R3 and connected to the anode + of the DC source via the resistors R2 and R1 and a backward diode D2 in this order. A collector of the transistor T1 is grounded via the resistors R4 and R5 in this order.

The base of the PNP transistor T2 is connected to a second output terminal OUT2 of the control circuit CC via the resistor R9 and connected to a node of the resistors R1 and R2 via the resistor R8. A collector of the transistor T2 is grounded via the resistors R6 and R7 in this order.

Emitters of the transistors T1 and T2 are connected to a common node of the resistors R2 and R8.

The base (control terminal) of the NPN transistor (switch element) T3 is connected to a node of the resistors R4 and R5, and the emitter (ground side terminal) is grounded. A collector (source side terminal) of the transistor T3 is connected to the anode + of the DC source via the resistor R10, the field coil L1 and the backward diode D1 in this order. In other words, according to the present invention, the resistor R10 for discharging the capacitor is connected between the field coil L1 and a switch section formed between the collector and the emitter of the transistor T3.

The base (control terminal) of the NPN transistor (switch element) T4 is connected to a node of the resistors R6 and R7, and the emitter (ground side terminal) is grounded. A collector (source side terminal) of the transistor T4 is connected to a node of the diode D1 and the field coil L1 via the resistor R11 and the field coil L2 in this order. In other words, according to the present invention, the resistor R11 for discharging the capacitor is connected between the field coil L2 and a switch section formed between the collector and the emitter of the transistor T4.

The Zener diodes ZD1 and ZD2 are connected in series in the same direction and inserted between a node of the field coil L1 and the resistor R10 and the base of the transistor T4 in a reverse orientation of the node of the field coil L1 and the resistor R10.

Also, the capacitor C1 is connected between the node of the field coil L1 and the resistor RiO and the emitter of the transistor T3, making a parallel connection to the transistor T3. In other words, according to the present invention, the capacitor C1 is also connected in parallel with the resistor R10 provided between the field coil L1 and the collector of the transistor T3, whereby the resistor R10 discharges the capacitor.

The Zener diodes ZD3 and ZD4 are connected in series in the same direction and inserted between a node of the field coil L2 and the resistor R1 and the base of the transistor T4 in a reverse orientation of the node of the field coil L2 and the resistor R11.

Also, the capacitor C2 is connected between the node of the field coil L2 and the resistor R11 and the emitter of the transistor T4, making a parallel connection to the transistor T4. In other words, according to the present invention, the capacitor C2 is also connected in parallel with the resistor R11 provided between the field coil L2 and the collector of the transistor T4, whereby the resistor R11 discharges the capacitor.

Next, the operation of the circuit according to the present invention will be described also with reference to FIG. 2.

The control circuit CC receives the signal from the hall element 43 for detecting the location of the rotor (permanent magnet) and outputs a signal from the output terminals OUT1 and OUT2 for performing the on/off control of the transistors T3 and T4.

The output signal from the control circuit CC is input to the transistors T1 and T2 for inverting polarity and for amplification, the transistors T1 and T2 performing the on/off control of the transistors T3 and T4.

More specifically, when the signal from the output terminal OUT1 of the control circuit CC is at a low level, the transistor T1 is turned on and current flows from the anode + of the DC source to the cathode − of the DC source via the diode D2, the resistor R1, the switch section between the emitter and the collector of the transistor T1, and resistors R4 and R5.

Accordingly, the transistor T3 the base potential of which is raised is turned on and current flows from the anode + of the DC source toward the cathode − of the DC source via the diode D1, the field coil L1, and the switch section between the collector and the emitter of the transistor T3, thereby generating a magnetic flux from the field coil L1.

The above operation will be continued until the signal from the output terminal OUT1 of the control circuit CC changes to a high level.

When the signal from the output terminal OUT2 of the control circuit CC is at a low level, the transistor T2 is turned on and current flows from the anode + of the DC source to the cathode − of the DC source via the diode D2, the resistor R1, the switch section between the emitter and the collector of the transistor T2, and the resistors R6 and R7.

Accordingly, the transistor T4 the base potential of which is raised is turned on and current flows from the anode + of the DC source toward the cathode − of the DC source via the diode D1, the field coil L2, and the switch section between the collector and the emitter of the transistor T4, thereby generating a magnetic flux from the field coil L2.

The above operation will be continued until the signal from the output terminal OUT2 of the control circuit CC changes to a high level.

Here, the low-level signal to the base of each of the transistors T1 and T2 is alternately output at an appropriate interval and time from the output terminals OUT1 and OUT2 of the control circuit CC which received the signal from the hall element 43. Accordingly, electricity is alternately applied to the field coils L1 and L2 similarly and, thereby the field coils L1 and L2 generate a rotating magnetic field.

Consequently, the rotor of the fan motor 42 rotates as described above to externally exhaust heat in the housing.

The Zener diodes ZD1 and ZD2, and ZD3 and ZD4 reduce the destruction of elements including the transistors T3 and T4 and so on due to a high voltage (a high voltage generated periodically) generated when the electricity of the field coils L1 and L2 is turned off).

Figure 2:
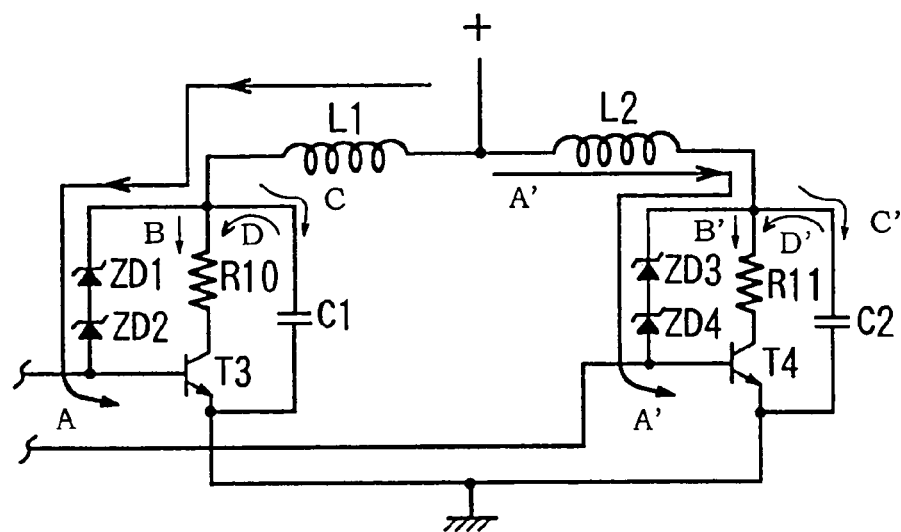
FIG. 2 is an explanatory view of the operation of the same circuit.
Figure 4:
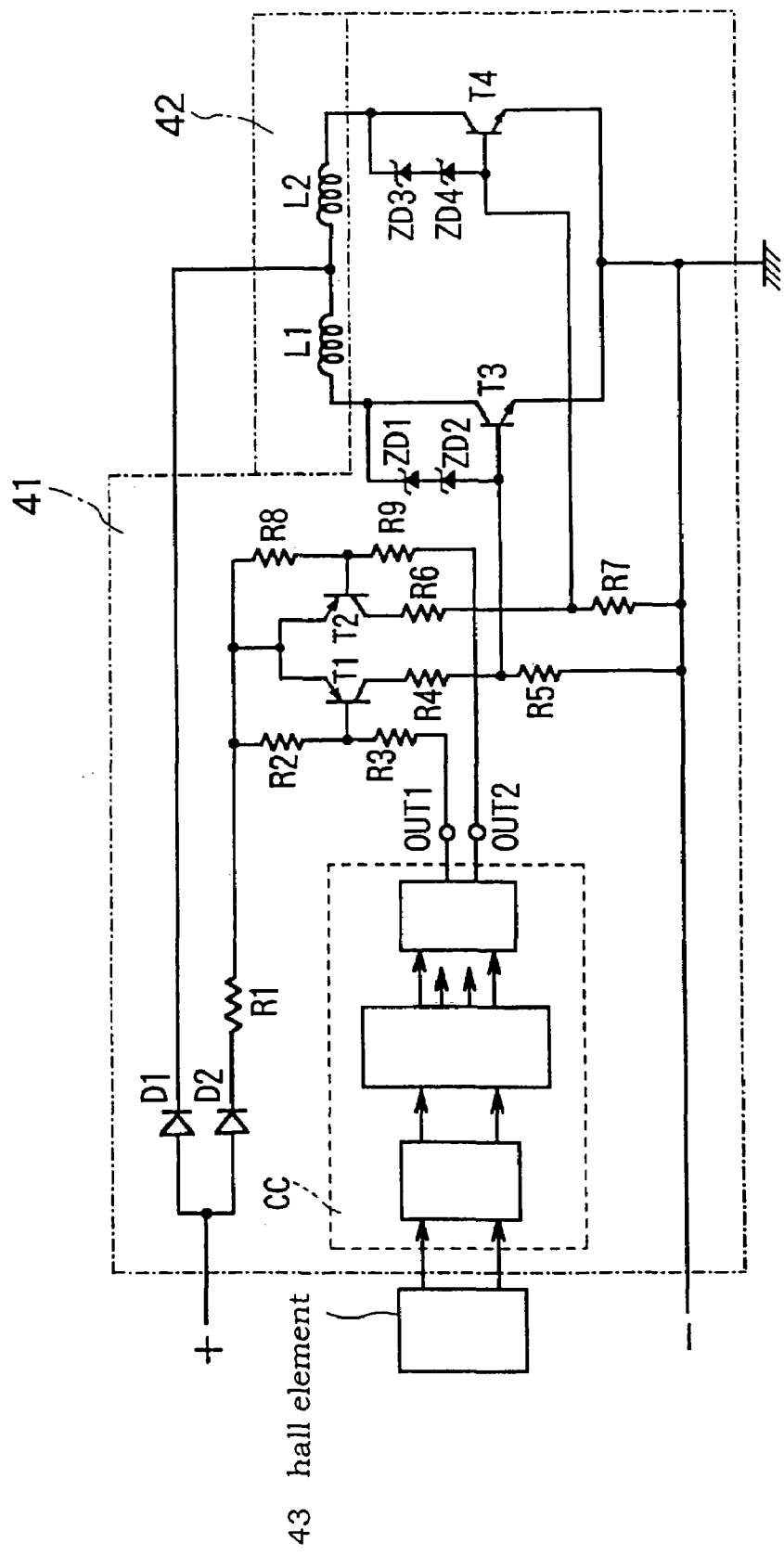
FIG. 4 is a view of a conventional circuit.
Figure 5:
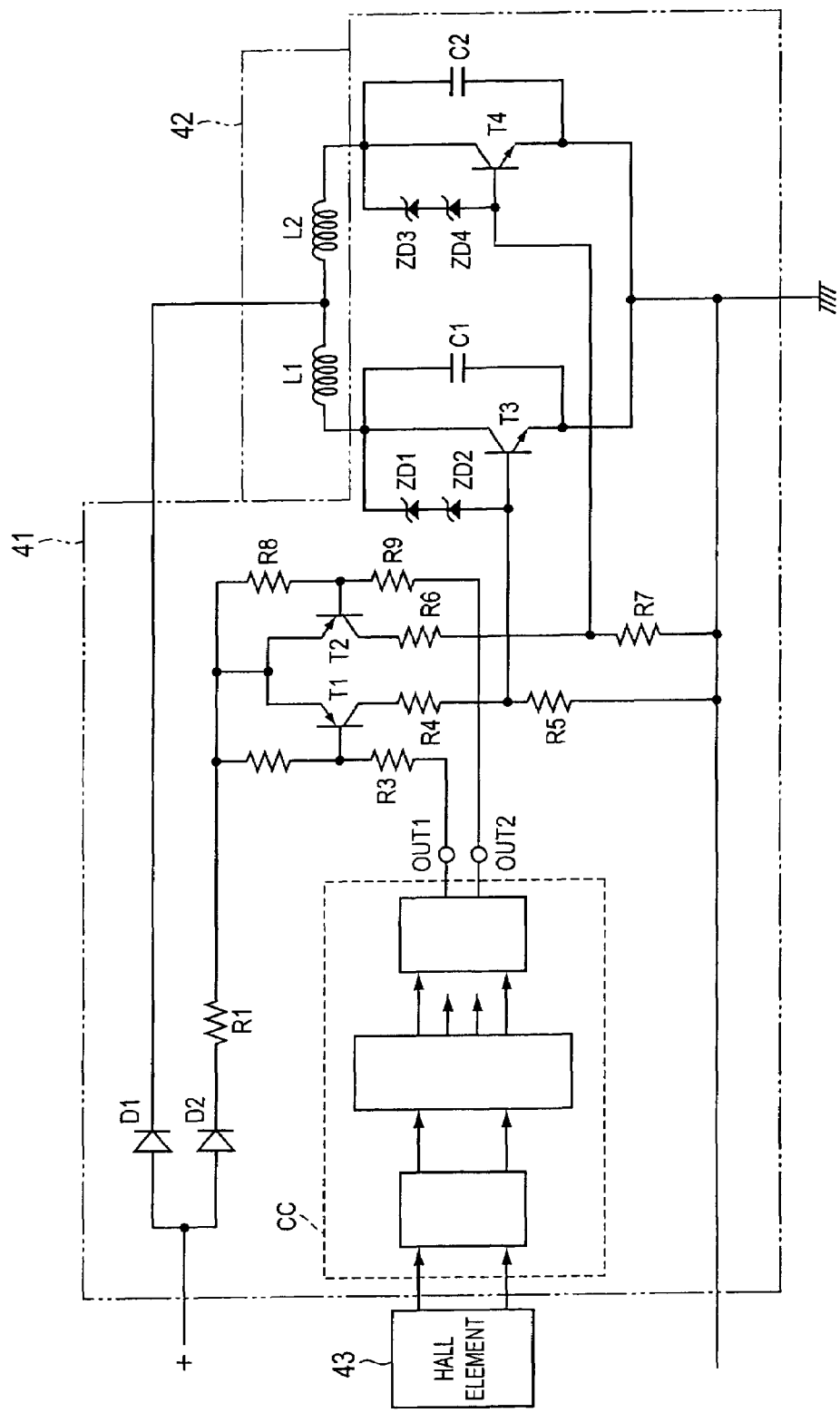
FIG. 5 is a view of another conventional circuit.

More specifically, when the voltage between both ends of the Zener diodes ZD1 and ZD2, and ZD3 and ZD4 is raised to a predetermined value or more due to the high voltage upon turning off the electricity, both ends are connected to allow electric current to flow as shown by the arrows A and A' in FIG. 2, thereby preventing destruction of the elements including the transistors T3 and T4 and so on in a manner similar to the conventional circuits shown in FIGS. 4 and 5.

The capacitors C1 and C2 pass a current spike toward itself (refer to the arrows C and C' in FIG. 2), the current tending to flow toward the collector of each of the transistors T3 and T4 (refer to the arrows B and B' in FIG. 2) due to a high voltage upon turning off the electricity for absorbing, thereby reducing the noise, which is similar to the conventional circuit shown in FIG. 5.

In the circuit of the present invention, as shown in FIG. 1, the capacitor C1 is not only connected in parallel with the transistor T3 of the switch section, but also connected in parallel with the resistor R10 provided between the field coil L1 and the collector of the transistor T3. Furthermore, the capacitor C2 is also connected in parallel with the transistor T4 of the switch section and the resistor R11 provided between the field coil L2 and the collector of the transistor T4.

With such a construction, discharge current of the capacitors C1 and C2 flowing toward the collector of the transistors T3 and T4 when the transistors T3 and T4 are turned on after a current spike has flowed toward the capacitors C1 and C2 flows via the resistors R10 and R11, as indicated by the arrows D and D' in FIG. 2. As a result, the current discharge spike is reduced, so that noise produced by a steep discharge current is eliminated, thereby realizing a low noise level. That is similar to the case of using chip capacitors (not shown) as the capacitors C1 and C2.

Also upon startup of the motor, a current spike flows toward the collector of the transistors T3 and T4, causing the noise. In this case as well, a reduced current spike flows by the capacitors C1 and C2 and the resistors R10 and R11. Consequently, noise caused by a current discharge spike can be eliminated, thereby realizing a low noise level.

Figure 3:
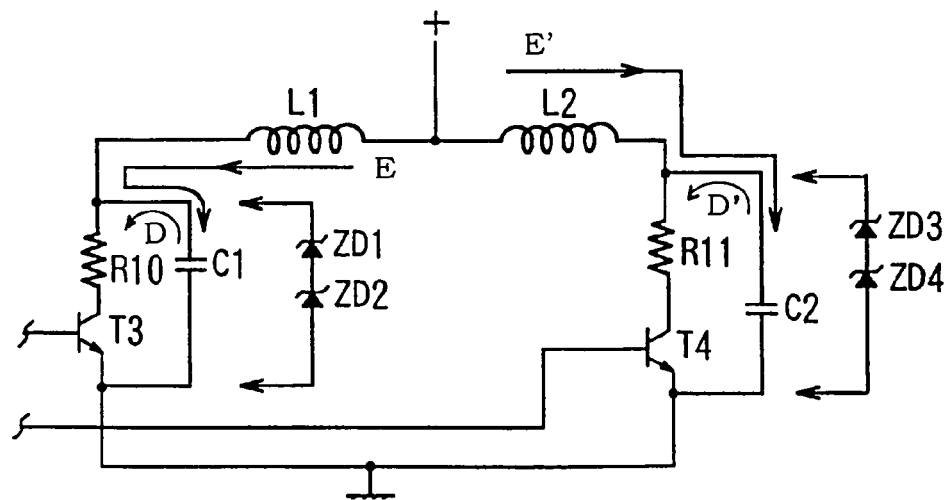
FIG. 3 is a circuit diagram of an essential part of another embodiment of the same circuit.

In the above embodiment, although the Zener diodes ZD1 and ZD2, and ZD3 and ZD4 are connected between the node of the field coils L1 and L2 and the resistors R10 and R11 and the base of the transistors T3 and T4, respectively, they may be connected between both ends of the capacitors C1 and C2, as shown in FIG. 3. Alternatively, the Zener diodes ZD1 and ZD2, and ZD3 and ZD4 may be omitted depending on the value of the voltage generated when the electricity of the field coils L1 and L2 is turned off, or the Zener diode may be one provided for each capacitor (for example, ZD1 and ZD3).

Referring to FIG. 3, symbols E and E' indicate a current spike from each of the field coils L1 and L2, respectively. In addition, elements similar or corresponding to those in FIGS. 1 and 2 are indicated by the same reference numerals in FIG. 3.

In the above embodiments, although an NPN transistor is used as a switch element, a PNP transistor may be used, alternatively, a field-effect transistor (FET) or the like may be used.

Furthermore, the brushless DC fan motor is not limited to the two-phase unipolar drive type.

As described above, in accordance with the present invention, the drive circuit for a brushless DC fan motor comprises: the field coil; a switch element in which a switch section is connected in series with the field coil; a rotor having a permanent magnet; capacitor connected in parallel with the switch section for absorbing a current spike; and a resistor inserted between the field coil and the switch section being in parallel with the capacitor for discharging the capacitor, wherein the flow of electric current to the field coil is turned on or off by a signal to a control terminal of the switch element to rotate the rotor by a rotating magnetic field produced by the field coil.

With such a construction, a current spike caused upon turning off the flow of the electric current to the field coil or upon starting up a motor is absorbed by the capacitor, thereby reducing the noise. In addition, a steep discharge current of the capacitor which absorbed the current spike upon turning on the switch element flows via the resistor, producing a flat-peak (not a spike) current, thereby preventing the noise due to various causes to realize a sufficiently low noise level.

The drive circuit for a brushless DC fan motor according to the present invention further comprises the Zener diode connected between the node of the field coil and the capacitor and the control terminal of the switch element or between both ends of the capacitor in a reverse direction of the polarity therebetween.

With such a construction, the effect of reducing a voltage can be obtained at a wide range (value) for a high voltage generated when turning off the flow of the electric current to the field coil, decreasing a peak value of electric current flowing to the power supply side terminal (switch section) of the switch element, thereby enhancing the effect of reducing the noise.

What is claimed is:

1. A drive circuit for a brushless DC fan motor, comprising:
    a field coil provided at a stator;
    a switch element in which a switch section formed between a power supply side terminal and a ground side terminal is connected in series with the field coil;
    a rotor having a permanent magnet;
    a capacitor connected in parallel with the switch section for absorbing a current spike; and
    a resistor for discharging the capacitor enabling noise reductions, inserted between the field coil and the switch section, being also in parallel with the capacitor and a Zener diode in a reverse polar direction,
    wherein a flow of electric current to the field coil is turned on or off by a signal to a control terminal of the switch element to rotate the rotor by a rotating magnetic field produced by the field coil.

2. The drive circuit for a brushless DC fan motor according to claim 1, further comprising:
    the Zener diode connected between a node of the field coil and the capacitor and the control terminal of the switch element or between both ends of the capacitor in a reverse direction of the polarity therebetween.

* * * * *